United States Patent [19]

Samie et al.

[11] Patent Number: 5,495,927

[45] Date of Patent: Mar. 5, 1996

[54] CONTROLLED COOLING APPARATUS FOR TORQUE TRANSFER DEVICES

[75] Inventors: Farzad Samie, Birmingham; Andrew L. Bartos, Clarkston, both of Mich.

[73] Assignee: General Motors Corporation, Detroit, Mich.

[21] Appl. No.: 266,814

[22] Filed: Jun. 24, 1994

[51] Int. Cl.$^6$ .......................... F16D 13/72; F16D 25/064
[52] U.S. Cl. .................. 192/70.12; 192/85 AA; 192/113.36; 188/71.6; 188/264 E
[58] Field of Search .............. 192/70.12, 85 AA, 192/113.3, 113.34, 113.35, 113.36; 188/71.6, 264 D, 264 E

[56] References Cited

U.S. PATENT DOCUMENTS

| | | | |
|---|---|---|---|
| 1,189,176 | 6/1916 | Price | 192/70.12 |
| 1,380,823 | 6/1921 | Matthews et al. | 192/113.36 X |
| 2,419,253 | 4/1947 | Cahill | 192/70.12 X |
| 2,583,919 | 1/1952 | Wilson | 192/113.36 X |
| 2,794,526 | 6/1957 | Canfield | 192/70.12 |
| 2,879,872 | 3/1959 | Van Ranst. | |
| 3,605,963 | 9/1971 | Roob et al. . | |
| 3,791,498 | 2/1974 | Wassermann . | |
| 4,674,616 | 6/1987 | Mannino, Jr. | 192/113.36 X |
| 4,721,191 | 1/1988 | Dowell | 192/113.36 X |
| 4,995,500 | 2/1991 | Payvar | 192/113.36 X |

FOREIGN PATENT DOCUMENTS

| | | | |
|---|---|---|---|
| 2331315 | 1/1975 | Germany | 192/113.36 |
| 60-98225 | 6/1985 | Japan . | |
| 934002 | 8/1963 | United Kingdom . | |

*Primary Examiner*—Richard M. Lorence
*Attorney, Agent, or Firm*—Donald F. Scherer

[57] ABSTRACT

A torque transfer device embodying the concepts of the present invention utilizes a plurality of first apply torque plates and a plurality of second reaction torque plates. Each torque plate has a generally flat annular disk portion, and passages penetrate the flat disk portion of the torque plates. The disk portions of the first and second torque plates are interleaved, and an annular friction disk is interposed between the successively adjacent interleaved disk portions. Circumferentially spaced and annularly disposed apertures penetrate each friction disk. The passages in the flat disk portion of the first and second torque plates are located in register with the apertures penetrating the friction disks. Each friction disk may have a planar reverse surface that is attached to the disk portion of one torque plate. Each friction disk also has an obverse engaging face operatively to engage the successively adjacent disk portions. An annular channel is provided in the obverse engaging face of each friction disk, and the apertures are located within the channel. A plurality of circumferentially spaced recesses extend radially of the obverse engaging surface to intersect the channel.

13 Claims, 5 Drawing Sheets

CONTROLLED COOLING APPARATUS FOR TORQUE TRANSFER DEVICES

TECHNICAL FIELD

The present invention relates generally to torque transfer devices. More particularly, the present invention relates to a unique structural arrangement for controlling the supply of a cooling lubricant to the frictionally engageable components of torque transfer devices. Specifically, the present invention relates to a unique structural arrangement by which to effect lower spin losses and simultaneously to effect increased cooling of frictionally operated torque transfer devices.

BACKGROUND OF THE INVENTION

Torque transfer devices of the type typically used in automatic transmissions for vehicles are interposed between two relatively rotatable members. That is, a torque transfer device may be interposed between an input shaft and an output shaft, or between a rotatable shaft and a fixedly positioned member, commonly designated as "ground." Hence, one of the relatively rotatable members may be either rotatable or fixed, but the other relatively rotatable member is rotatable. A torque transfer device may, therefore, operate either as a clutch operatively to join two rotatable members or as a brake operatively to connect a rotatable member to ground.

A typical torque transfer device comprises a plurality of apply or first torque plates that are nonrotatably connected to one of the relatively rotatable members (as by a plurality of tangs on each of the first torque plates which engage a grooved spline arrangement on the relatively rotatable input member). The typical torque transfer device also employs a plurality of interleaved reaction or second torque plates that are nonrotatably connected to the other of the relatively rotatable members (as by a plurality of tangs on each of the second torque plates which engage a grooved spline arrangement on the relatively rotatable output member or ground). Annular friction disks are generally interposed between the successively interleaved first and second torque plates, and to assure that the several friction disks will not be displaced when they are not compressed between the successive first and second torque plates, each friction disk is preferably secured to one of the torque plates between which it is sandwiched.

Torque transfer devices are commonly actuated by a piston mechanism that axially compresses and releases the interleaved torque plates. Upon the application of pressure by the piston mechanism, the angular velocity of, for example, an output shaft will assume the angular velocity of an input shaft, and the power delivered by the input shaft is thereby transmitted through the torque transfer device to the output shaft. In this situation the torque transfer device is operating as a clutch.

As implicit from its name, a torque transfer device transmits torque when engaged but torque transfer devices also absorb the shift energy during power shifts, and dissipate that energy as heat. A typical torque transfer device requires approximately 0.5 seconds to be compressed sufficiently to eliminate relative rotation between the first and second torque plates. A considerable amount of heat can be generated during the approximately 0.5 seconds required to eliminate relative rotation between the first and second torque plates in a torque transfer device.

Conventional torque transfer devices are cooled by the circulation of transmission fluid, which is continuously supplied and is, in fact, propelled between the interleaved torque plates by centrifugal forces when the torque plates are not compressed.

Cooling the torque transfer device improves its durability and lengthens its useful life. However, the lubrication process is also the primary source of slip or spin-loss, as the interleaved torque plates rotatably slide relative to one another during the application and release of compressive engagement. Given the means by which prior known torque transfer devices have been cooled, it has not been heretofore possible simultaneously to reduce spin-loss and enhance cooling. Instead, trade-offs must be accepted. Either the durability of the torque transfer apparatus is compromised—as a result of insufficient cooling—or fuel economy is compromised—as a result of slip loss between the torque plates in the torque transfer device.

Another disadvantage of the prior known cooling systems for torque transfer devices is that it has not heretofore been practical to supply continuous cooling to the interleaved torque plates—not only because such cooling would exacerbate the condition which causes slip-loss but also because such an approach would likely require a circulating pump of considerably higher capacity than is required for circulation of the transmission lubricant which serves as the cooling medium. All considered therefore, continuous cooling would raise the cost of the torque transfer device and decrease the power transferred therethrough.

SUMMARY OF THE INVENTION

It is, therefore, a primary object of the present invention to provide a new and novel cooling arrangement for a friction torque transfer device that overcomes the disadvantages of the prior known arrangements for cooling the interleaved torque plates in a torque transfer device.

It is another object of the present invention to provide an improved cooling arrangement for a torque transfer device, as above, which effectively cools vehicular transmissions while maintaining acceptable spin-losses.

It is a further object of the present invention to provide an improved cooling arrangement for a torque transfer device, as above, which maintains the slip or spin-losses to an acceptably low level while increasing the durability of the torque transfer device.

It is an even further object of the present invention to provide an improved cooling arrangement for a torque transfer device, as above, which cools the torque transfer device only when cooling is needed.

It is a still further object of the present invention to provide an improved cooling arrangement tier a torque transfer device, as above, which circulates the cooling medium through the torque transfer device concurrently with the accomplishment of the shift—i.e.: as soon as the torque transfer device is engaged—and thus no more than 0.5 seconds following initiation of the conversion of energy to heat.

It is yet another object of the present invention to provide an improved cooling arrangement for a torque transfer device, as above, which permits a cessation to the circulation of the cooling medium when the torque transfer device is disengaged.

It is also an object of the present invention to provide an improved cooling arrangement for a torque transfer device, as above, wherein the cooling arrangement may be electronically controlled.

These and other objects of the invention, as well as the advantages thereof over existing and prior art forms, which will be apparent in view of the following detailed specification, are accomplished by means hereinafter described and claimed.

In general, a torque transfer device embodying the concepts of the present invention utilizes a plurality of first or apply torque plates and a plurality of second or reaction torque plates that are interleaved with the first, or apply, torque plates. Each torque plate has a generally flat annular disk portion, and passage means penetrate the flat disk portion of the torque plates.

An annular friction disk is interposed between the disk portion of each first and second interleaved torque plates. Circumferentially spaced and annularly disposed aperture means penetrate each friction disk. The passage means in the flat disk portion of the first and second torque plates are located in register with the aperture means penetrating the friction disks.

In accordance with the present invention, each friction disk may have a planar reverse surface that is attached to the disk portion of one torque plate. Each friction disk also has an obverse engaging surface operatively to engage the disk portion of the successively adjacent interleaved torque plate. An annular channel is provided in the obverse engaging surface of each friction disk and the aperture means are located within the channel. A plurality of circumferentially spaced recesses extend radially of the obverse engaging surface to intersect the channel. As such, the cooling medium admitted through the passage means in the torque plates flows into and through the aperture means in the friction disks to be distributed circumferentially by the channel and radially in the recesses that intersect the channel. The cooling medium thus flows through the torque transfer device, even when the torque plates are compressed to lockup—i.e.: when the first and second torque plates are rotating in unison by virtue of the frictional engagement therebetween.

To acquaint persons skilled in the arts most closely related to the present invention, one preferred embodiment of a cooling arrangement for a torque transfer device that illustrates a best mode now contemplated for putting the invention into practice is described herein by, and with reference to, the annexed drawings that form a part of the specification. The exemplary cooling arrangement for a torque transfer device is described in detail without attempting to show all of the various forms and modifications in which the invention might be embodied. As such, the embodiment shown and described herein is illustrative, and as will become apparent to those skilled in these arts can be modified in numerous ways within the spirit and scope of the invention; the invention being measured by the appended claims and not by the details of the specification.

DESCRIPTION OF AN EXEMPLARY EMBODIMENT

Figure 1:
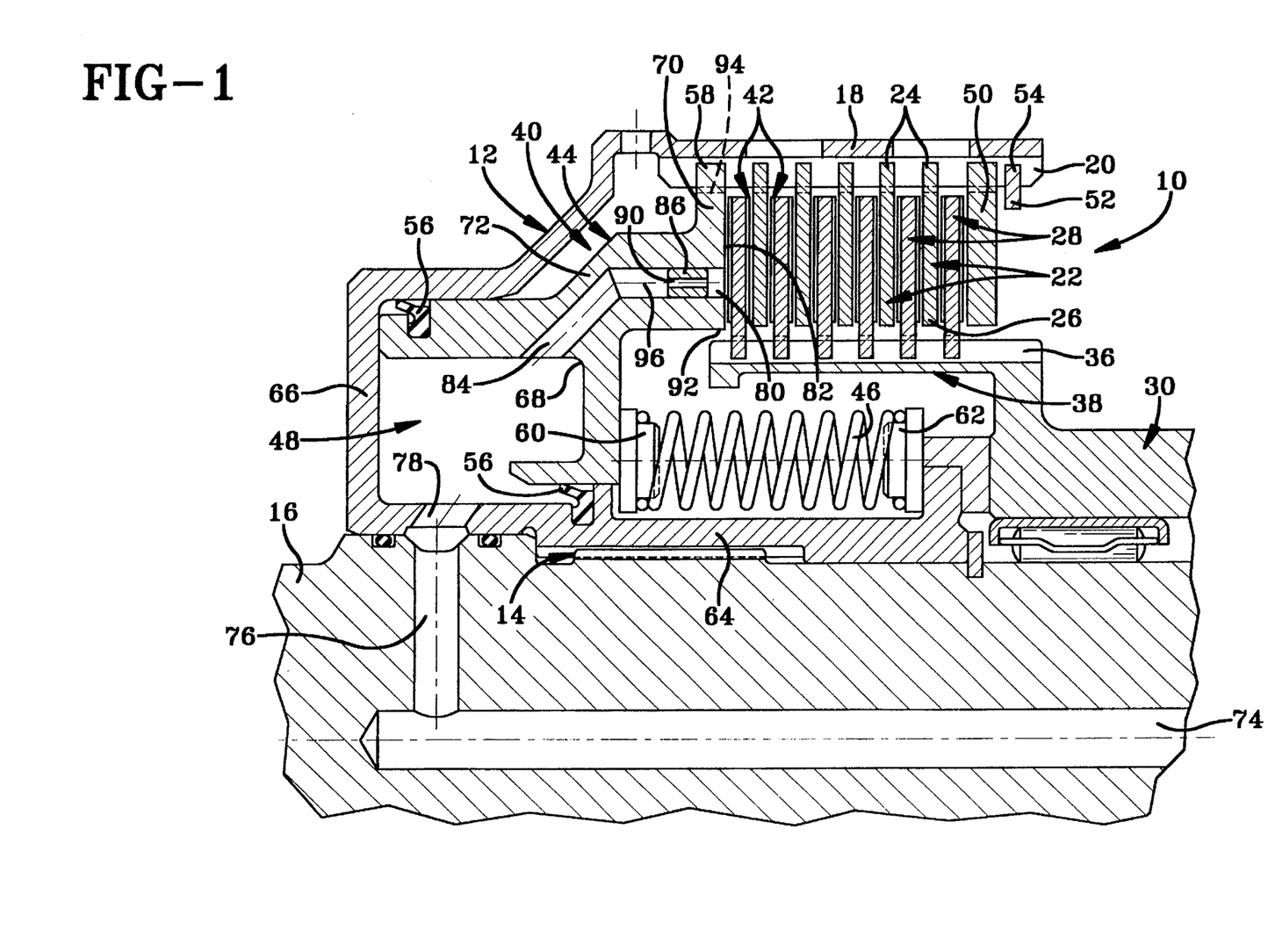
FIG. 1 is a diagrammatic cross-sectional view of that portion of a vehicular power transmission containing a torque transfer device that incorporates a cooling arrangement which embodies the concepts of the present invention.

One representative form of torque transfer device that embodies the concepts of the present invention, and which therefore incorporates a unique cooling arrangement, is designated generally by the numeral 10 on the accompanying drawings. The representative torque transfer device 10 serves selectively to conjoin two relatively rotatable members. A first relatively rotatable member may be exemplified by the annular input ring 12 that is operatively secured, as by a spline connection 14, to rotate with an input shaft 16. A radially outer annular skirt 18 is presented from the input ring 12, and the radially inner substantially cylindrical surface of the skirt 18 is provided with a plurality of circumferentially spaced axially extending splines 20. A plurality of first or apply torque plates 22 (individually represented in FIG. 2) are nonrotatably secured to the input ring 12. As shown, a plurality of tangs 24 extend radially outwardly from the annular disk portion 26 of each first or apply torque plate 22 to engage the axially extending splines 20 on the skirt portion 18 of the input ring 12.

The first or apply torque plates 22 are interleaved with a plurality of second or reaction torque plates 28 which are nonrotatably secured to the second of the relatively rotatable members, which is exemplified by the output shaft 30. The reaction torque plates 22 are secured to the output shaft 30 as by a plurality of tangs 32 that extend radially inwardly from the annular disk portion 34 of each second or reaction torque plate 28 to engage the axially extending splines 36 (FIG. 1) on an annular hub 38 of the output shaft 30.

A piston assembly 40 selectively compresses the interleaved torque plates 22 and 28 against a plurality of unique friction disks 42—which are hereinafter described in greater detail—sandwiched between the respective first and second torque plates 22 and 28 in a well known manner. The piston assembly 40 includes an annular piston 44 that is axially translatable against the biasing force of a spring 46 by hydraulic pressure within a control chamber 48. The interleaved torque plates 22 and 28 are selectively compressible against a reaction plate 50, the axial position of which is secured by a snap ring 52 received in a recess 54 on the radially inner side of the skirt 18. A plurality of seals 56 maintain the desired integrity of the control chamber 48 within the input ring 12.

In order to preclude relative rotation between the piston 44 and the input ring 12, and the operatively conjoined input shaft 16, a plurality of tangs 58 extend radially outwardly from the piston 44 to engage the axially extending splines 20 on the skirt portion 18 of the input ring 12. By thus precluding relative rotation between the piston 44 and the input shaft 16, the spring 46 can engage the opposed axially aligned seats 60 and 62 supported, respectively, from the piston 44 and the collar portion 64 of the input ring 12 without being adversely twisted or otherwise affected by rotation of the piston 44 relative to the input shaft 16.

With continued reference to FIG. 1, the input ring 12 has an end wall 66 that extends radially between the annular collar portion 64—that circumscribes the input shaft 16—of the input ring 12 and the skirt portion 18 thereof. The radial end wall 66 and the collar portion 64 define the axially fixed surfaces of control chamber 48. The J-shaped base 68 of the piston 44 opposes the end wall 66 as well as the collar portion 64 to define the reaction surfaces that effect translation of the piston 44 in response to pressure within the control chamber 48 sufficient to overcome the biasing action of the spring 46.

The head portion 70 of the piston 44 is integrally attached to the base 68 by a generally conical web wall 72.

Pressurized hydraulic fluid may be selectively supplied to the control chamber 48 by a supply passage 74 that may extend axially within the input shaft 16 and communicate with one or more radial supply branches 76 that, in turn, communicate through the collar portion 64 of the input ring 12, as by one or more ports 78.

The control chamber 48 communicates with an annular groove 80 recessed in the face 82 of the head portion 70 of the piston 44, as by one or more feed passages 84 that extend within the web wall 72 of the piston 44. A flow restricting plug 86 is secured within the feed passage 84 at the juncture of the feed passage 84 with the annular groove 80 in the face 82 of the piston head portion 70. A fluid cooling medium, which may well be the hydraulic lubricating fluid, may be delivered in the customary fashion through the supply passage 74, under pressure, as by a pump (not shown).

In a conventional torque transfer apparatus, the cooling lubrication is generally provided by a continuous supply of transmission fluid. The transmission fluid is injected between the interleaved first and second torque plates 22 and 28, respectively, by centrifugal force during the time when the torque plates are disengaged.

The primary disadvantages of the prior art cooling systems are that both the efficiency at which power is transferred through the torque transfer device and fuel economy suffer due to the unavoidable slip-loss which occurs when the apply torque plates spin relative to the reaction torque plates, even though it only takes on the order of 0.5 seconds for lockup to occur. That is, slip-losses only occur during the engagement process, and that process takes, on average, about 0.5 seconds. In addition, the pump which supplies the transmission fluid that serves as the cooling lubricant under a positive pressure must be unnecessarily oversized, thus adding to the cost of the pump and draining power away from the output shaft 30.

To the contrary, the improved torque transfer device 10 shown in FIG. 1 supplies cooling lubricant only when the cooling lubricant is needed—i.e., at least during the process of engaging the torque plates, although in the present embodiment the flow may continue during the entire time that the torque plates are engaged. However, when the torque plates are disengaged, the flow of the cooling medium will cease.

In the embodiment shown in FIG. 1, the flow of the cooling medium begins in conjunction with actuation of the piston 44.

With continued reference to FIG. 1, the aperture 90 in each flow restricting plug 86 has a diameter between about 0.010 of an inch and about 0.050 of an inch. In the preferred embodiment, there are four feed passages 84 spaced circumferentially about the web wall 72, and each of the feed passages 84 is supplied with a flow restricting plug 86. Each aperture 90 in the four flow restricting plugs 86 has a diameter of about 0.025 of an inch. When the fluid cooling medium is supplied at 120 pounds per square inch, the four apertures 90 allow a flow rate of about 0.5 gallons per minute.

It will also be observed that the annular groove 80 in the face 82 of the piston 44 is not centered. That is, the groove 80 is located closer to the radially inner edge 92 of the annular piston 44 than it is to the radially outer edge 94 thereof. In fact, the annular center reference circle 96 of the groove 80 is preferably located outwardly of the radially inner edge 92 at approximately one-third of the radial distance between the radially inner and radially outer edges 92 and 94, respectively, of the piston head portion 70.

Figure 2:
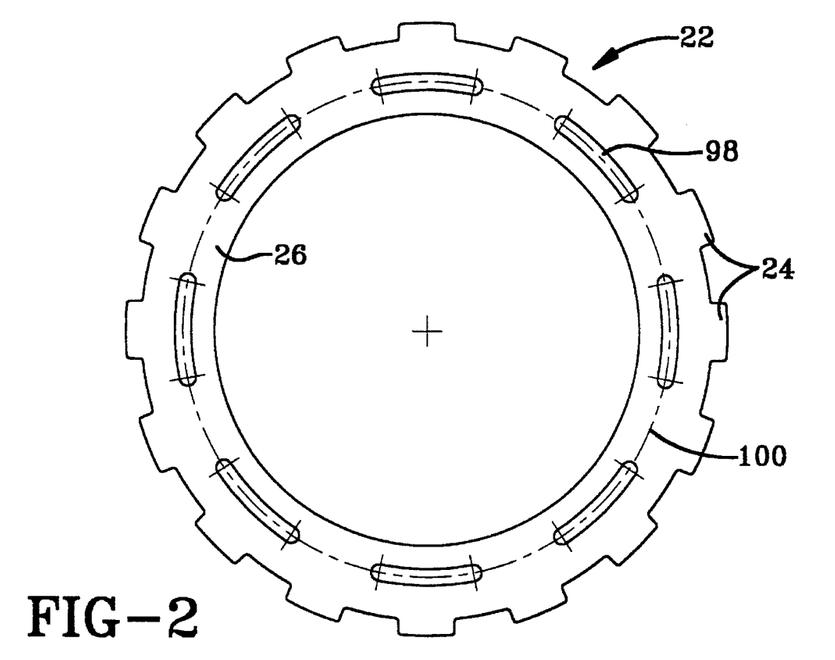
FIG. 2 is a plan view of a first or apply torque plate showing one form of circumferentially spaced annularly extending passages or slots which penetrate the annular disk-like engaging portion of the apply torque plate to allow a fluid cooling medium to flow therethrough.

With reference to FIG. 2, the first or apply torque plate 22 is provided with circumferentially spaced and annularly disposed apertures in the nature of slots 98. The annular reference circle 100 for the slots 98 is disposed congruently with the disposition of the reference circle 96 for the annular groove 80 in the face 82 of the piston head portion 70.

Figure 3:
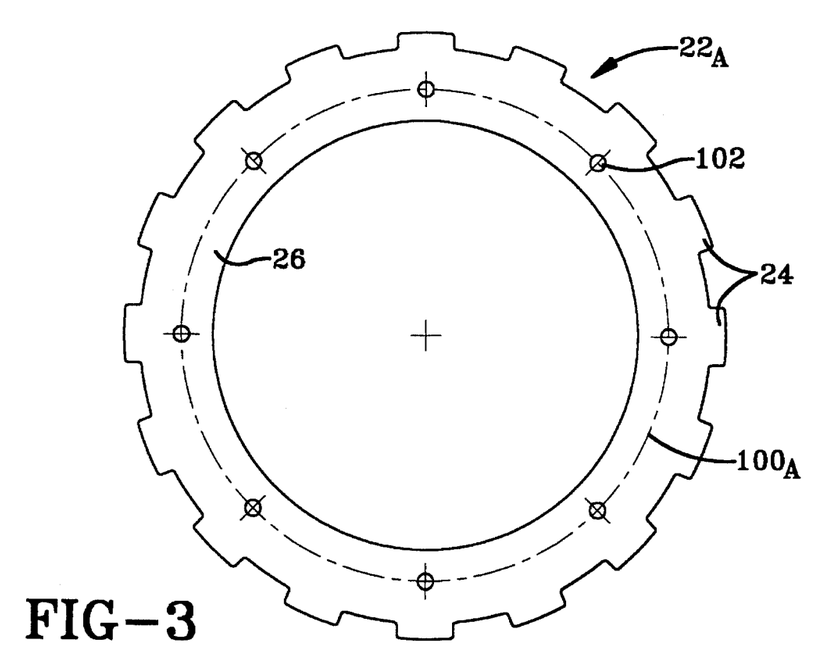
FIG. 3 is a plan view similar to FIG. 2, but depicting an alternative first or apply plate having another form of circumferentially spaced cylindrical passages or bores which penetrate the annular disk-like engaging portion of the apply torque plate to allow fluid cooling medium to flow therethrough.

With reference to FIG. 3, an alternative embodiment of the first or apply torque plate $22_A$ is depicted. The alternative torque plate $22_A$ is provided with circumferentially disposed and circumferentially spaced apertures in the nature of bores 102. The reference circle $100_A$ for the bores 102 is also disposed congruently with the disposition of the reference circle 96 for the annular groove 80 in the face 82 of the piston head portion 70. Otherwise, the alternative first torque plate $22_A$ is identical with torque plate 22. That is, torque plate $22_A$ has a plurality of tangs 24 that extend radially outwardly from an annular disk portion 26, and the bores 102 penetrate the annular disk portion 26.

Figure 4:
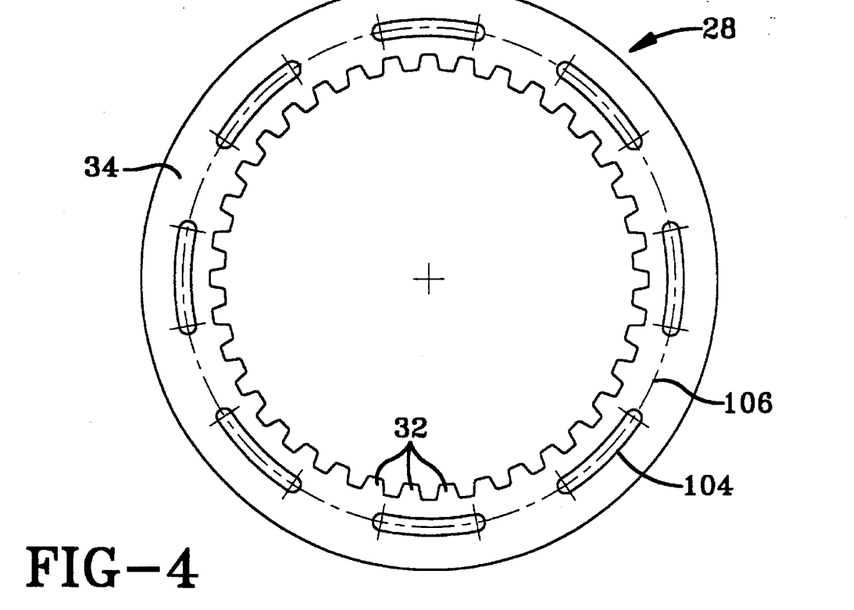
FIG. 4 is a plan view of a second or reaction torque plate showing one form of circumferentially spaced annularly extending passages or slots which penetrate the annular disk-like engaging portion of the reaction torque plate to allow a fluid cooling medium to flow therethrough.

With reference to FIG. 4, the second or reaction torque plate 28 is provided with circumferentially spaced and annularly disposed apertures in the nature of slots 104. The reference circle 106 for the slots 104 is disposed congruently with the disposition of the reference circle 96 for the annular groove 80 in the face 82 of the piston head portion 70, as well as with the disposition of the reference circles 100 or $100_A$, for the apertures in the first torque plates 22 or $22_A$, respectively.

Figure 5:
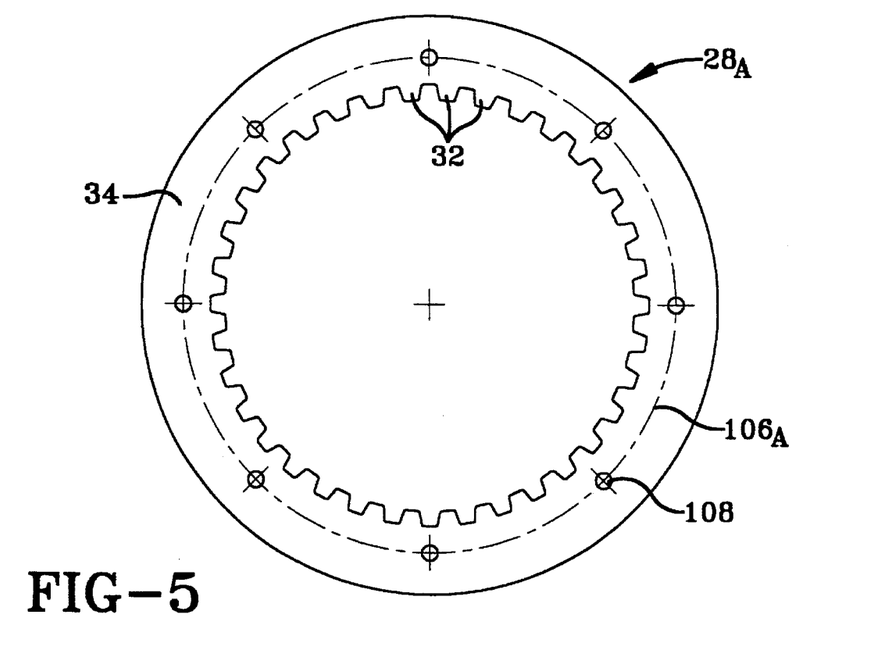
FIG. 5 is a plan view similar to FIG. 4, but depicting an alternative second or reaction plate showing another form of circumferentially spaced cylindrical passages or bores which penetrate the annular disk-like engaging portion of the reaction torque plate to allow fluid cooling medium to flow therethrough.

With reference to FIG. 5, an alternative embodiment of the second or reaction torque plate $28_A$ is depicted. The alternative torque plate $28_A$ is provided with circumferentially spaced apertures in the nature of bores 108. The reference circle 106$_A$ for the bores 108 is also disposed congruently with the disposition of the reference circle 96 for the annular groove 80 in the face 82 of the piston head portion 70. Other, vise, the alternative second torque plate 28$_A$ is identical with torque plate 28. That is, torque plate 28$_A$ has a plurality of tangs 32 that extend radially inwardly from an annular disk portion 34, and the bores 108 penetrate the annular disk portion 34. The purpose of the previously described passages—be they slots 98 or 104 or bores 102 or 108—is to cooperate with the hereinafter described friction disks 42 and allow cooling lubricant to flow axially through the torque transfer device 10 to be available for annular and radial distribution in order to accomplish the desired cooling. In the preferred embodiment, that reaction torque plate 28 or 28$_A$ which lies contiguously adjacent to the reaction plate 50 need not be provided with any slots or bores inasmuch as no friction disks 42 are disposed beyond the reaction plate 50.

Figure 6:
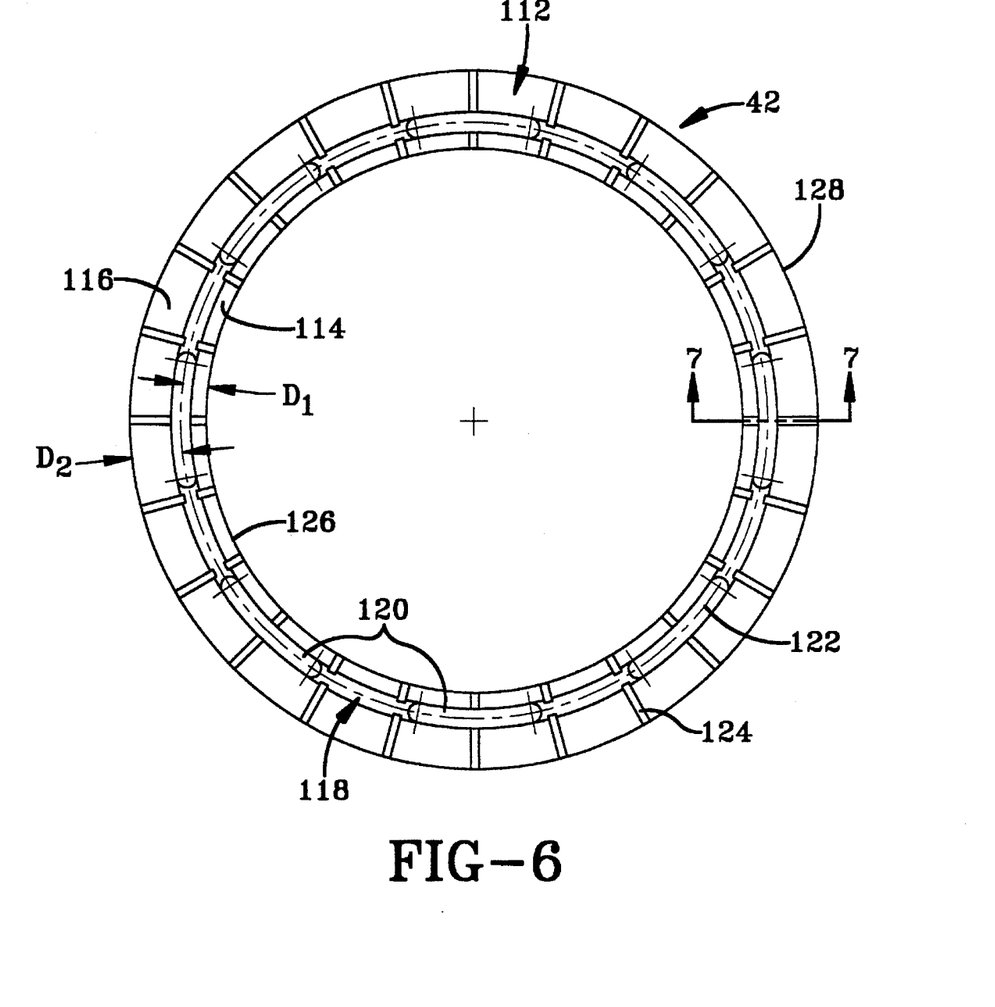
FIG. 6 is a plan view of the obverse engaging surface of a unique friction disk of the type that is particularly suited for use in conjunction with a torque transfer device embodying the concepts of the present invention.
Figure 7:
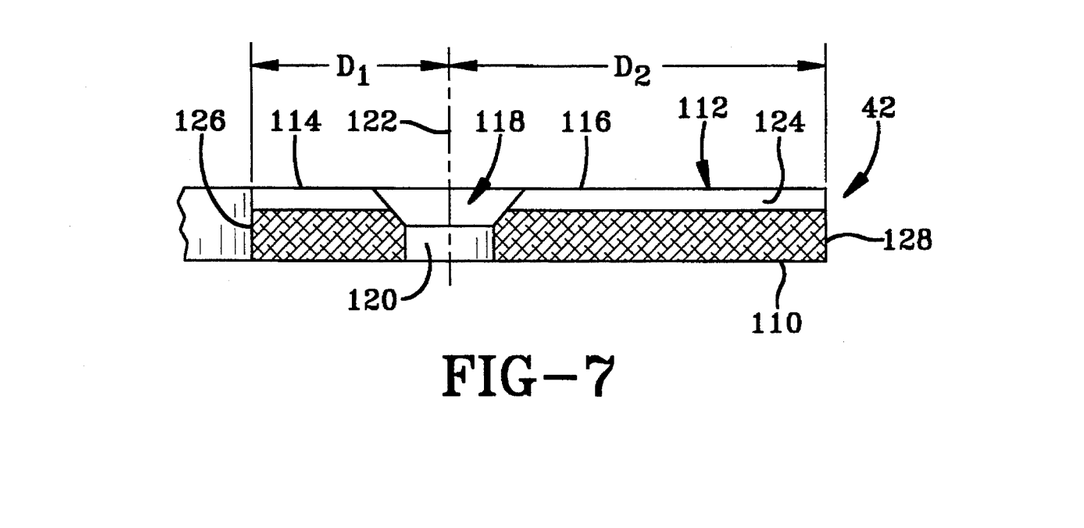
FIG. 7 is an enlarged cross-sectional view taken substantially along line 7—7 of FIG. 6 to depict the annular distribution channel and the radial distribution recesses utilized in the friction disk depicted in FIG. 6; and, FIG. 8 is a view similar to FIG. 1 but depicting an alternative arrangement by which to introduce the fluid cooling medium to a torque transfer device embodying the concepts of the present invention.

With reference to FIG. 6, a unique configuration for the friction disks 42 is depicted. The friction disks 42 are interposed between the successively interleaved first and second torque plates 22 and 28, and to assure that the friction disks 42 will not be displaced to move independently of the torque plates 22 or 28, the preferably planar reverse surface 110 of each friction disk 42 may be secured to the opposite sides of the disk portion on one or the other of the torque plates 22 or 28 to permit the obverse working face 112 operatively to engage the successively adjacent torque plate. As shown, the preferably flat reverse surface 110 of each friction disk 42 is secured, as by a well known adhesive, to each of the opposite sides on the annular disk portion 34 of the second or reaction torque plates 28. The obverse working face 112 of each friction disk 42 may, as shown in FIGS. 6 and 7, present radially inner and radially outer annular engaging surfaces 114 and 116, respectively, which are separated by an annular channel 118. Circumferentially spaced annularly disposed slotted apertures 120 penetrate the friction disk 42 within the channel 118. As such, the slotted apertures 120, as well as the channel 118, are disposed along a reference circle 122.

A plurality of radially extending recesses 124 intersect, and thereby cross, the channel 118, but (as best seen in FIG. 7) they are preferably of lesser cross-sectional area than the channel 118. The channel 118 serves to effect circumferential distribution of the cooling medium, and the recesses 124 effect radial distribution of the cooling fluid, even when the torque transfer device is compressed sufficiently to effect rotational lockup.

By locating the channel 118 in radial congruence with the apertures—the slots 98 and/or the bores 102—in the first torque plates 22 or 22$_A$, as well as the apertures—the slots 104 and/or the bores 108—in the second torque plates 28 or 28$_A$, and by assuring that the slotted apertures 120 in each friction disk 42 communicate directly with the slots 98 or bores 102 in the first or apply torque plates 22 or 22$_A$, as well as the slots 104 or the bores 108 in the second torque plates 28 or 28$_A$, the desired flow of the cooling medium—both circumferentially and radially of the torque plates 22, 22$_A$, 28 and 28$_A$—is achieved to effect cooling of the torque transfer device 10, even during lockup.

The radially outer annular engaging surface 116 is preferably about twice as wide as the radially inner engaging surface 114 in order to introduce some resistance to radial flow of the cooling medium. Otherwise, an undue percentage of the cooling medium tends to flow toward the outer circumference of the torque transfer device as a result of centrifugal force. That is, the distance $D_1$ between the radially inner edge 126 of the friction disk 42 and the reference circle 122 is approximately one-half (½) the distance $D_2$ between the reference circle 122 and the radially outer edge 128 of the friction disk 42.

One of the important design parameters for the torque transfer device 10 is that the slots 98 and 104 or bores 102 and 108 in the torque plates 22, 22$_A$, 28 and 28$_A$ are aligned to reduce the pressure drop of the cooling lubricant as it passes axially within the torque transfer device 10. In addition, the number and size of the radially extending recesses 124 in the friction disks 42 must be carefully selected. If too many recesses 124 are employed, the interfaces between the plates 22 and 28 most closely adjacent the piston 44 will be cooled to a greater degree than the interfaces between the plates 22 and 28 most closely adjacent to the reaction plate 50. On the other hand, if too few recesses 124 are utilized, the cooling may be more uniform across all the interfaces, but the cooling capacity of the torque transfer device 10 will be lowered. According to the particular arrangement shown in FIG. 1, the optimum number of radial recesses 124 in the friction disks 42 was found to be twenty-four (24) when the cooling medium was supplied at 120 pounds per square inch through four flow restricting plugs 86, and the apertures 90 in each plug 86 had diameters of approximately 0.025 of an inch. A flow rate of 0.5 gallons per minute was achieved under these conditions, and excellent cooling results were obtained.

The selection of slots and/or bores, as well as their relative location, will also affect the cooling operation. The selection, of course, must permit full, and virtually unrestricted, axial flow through the torque transfer device. The use of slots in all the torque plates maximizes axial flow, and also maximizes cooling, but the cooling will not be uniform throughout the torque transfer device. The use of bores will effect a more even distribution of the cooling affect throughout the torque transfer device, but the cooling will not be maximized. One could, therefore, use bores in those torque plates (both apply and reaction) located in proximity to the piston 44 and use slots in those torque plates (also both apply and reaction) located in proximity to the reaction plate 50 in order to achieve both maximum cooling and a more even distribution of the cooling affect throughout the torque transfer device. However, such an approach can increase assembly costs, and for the majority of installations would not be warranted.

Figure 8:
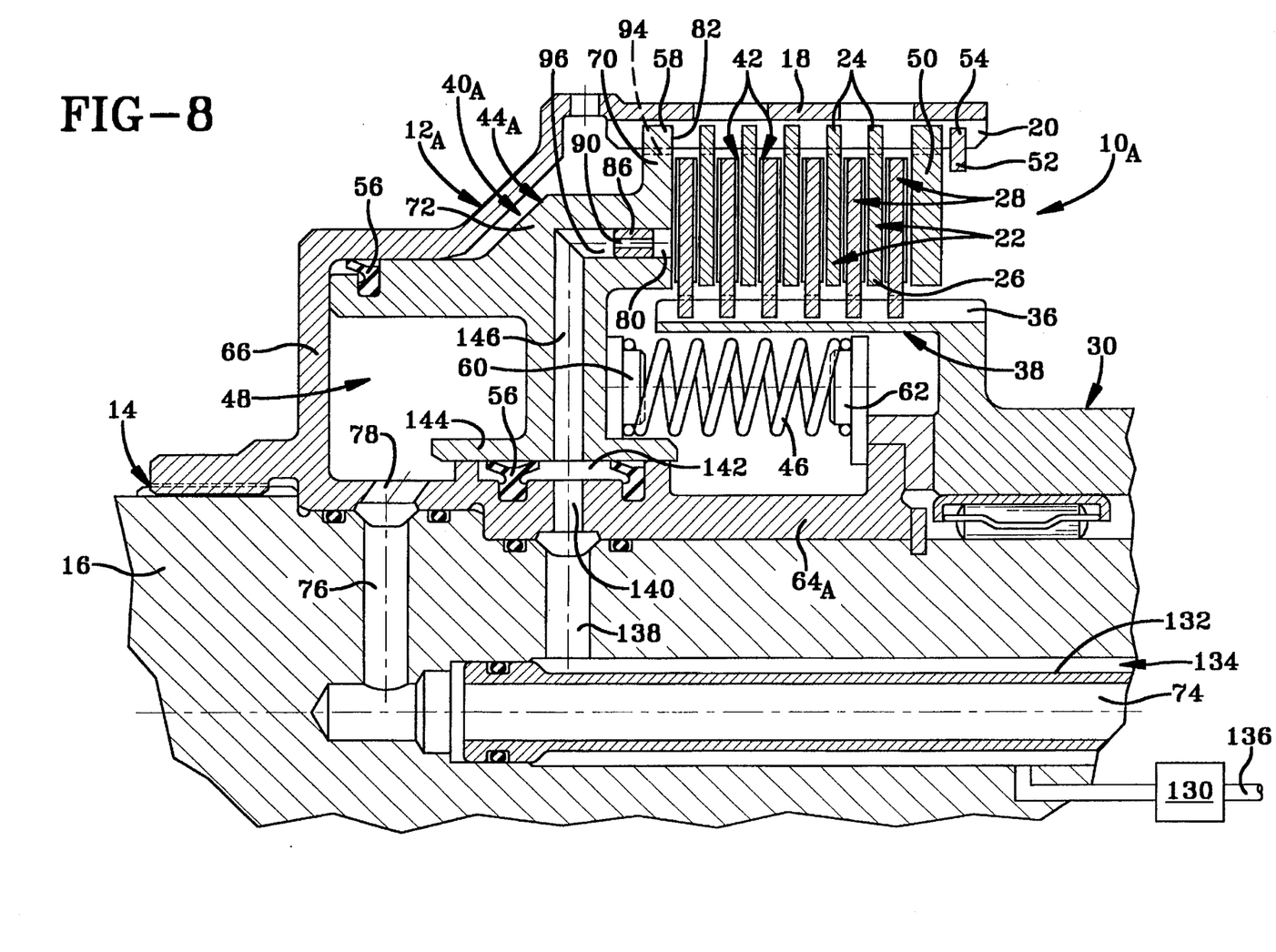

With reference to FIG. 8, an alternate means for supplying the cooling medium to the torque transfer device 10$_A$ is disclosed. Specifically, the alternative arrangement for supplying the cooling medium utilizes a valve 130 which may be electronically controlled to permit the valve to be selectively opened or closed under predetermined conditions. A sleeve 132 is mounted inside the supply passage 74 to provide a sub-passage 134 that is selectively supplied with pressurized cooling medium through valve 130 from a supply conduit 136. One or more radially disposed feed branches 138 communicate between the sub-passage 134 and a second port 140 that penetrates the collar portion 64$_A$ of the input ring 12$_A$. The port 140 feeds an annular transfer chamber 142 located between the collar portion 64$_A$ and an annular slide flange 144 on the piston assembly 40$_A$. A feed passage 146 extends through the piston 44$_A$ to effect communication between the transfer chamber 42 and the annular groove 80 in the face 82 of the piston head portion 70.

There may also be a plurality of feed passages 146, and each feed passage 146 may receive a flow restricting plug 86 in proximity to the juncture of the feed passage 146 and the annular groove 80. As such, the control chamber 48 does not communicate with the annular groove 80 in this arrangement, but in all other respects the construction of the torque transfer device itself is the same as shown in, and described in conjunction with, FIG. 1.

The function of the torque transfer device 10$_A$ depicted in FIG. 8 is, therefore, the same as the function of the previously described torque transfer device 10 depicted in FIG. 1, except that the cooling medium may be selectively circulated during lockup and circulation may be selectively discontinued after the torque transfer device 10$_A$ has been properly cooled, without effecting the lockup condition of the torque transfer device. Aside from the advantage of supplying circulation of the cooling medium only when it is required, this arrangement also has the advantage of requiring an even lower capacity pump.

From the foregoing description, it should be readily apparent to those skilled in the art that an improved torque transfer apparatus incorporating an improved cooling control means is disclosed. The invention has been described with reference to a preferred embodiment and one alternative variation thereof. Additional modifications may occur to those skilled in the art in view of the foregoing disclosure. The present disclosure is intended to include such modifications so far as they come within the scope of the appended claims or the equivalents thereof. Therefore, the scope of the present invention is not to be limited to the details shown and described but is intended to include all changes and modifications which come within the scope of the appended claims.

All considered, it should now be apparent that the present invention not only teaches that a torque transfer device embodying the concepts of the present invention is capable of being cooled in a most efficient manner so as to virtually eliminate slip loss, but also that the other objects of the invention can be likewise accomplished.

The embodiments of the invention in which an exclusive property or privilege is claimed are defined as follows:

1. A torque transfer device comprising:

a reaction plate;

a piston assembly;

a plurality of first, apply torque plates;

a plurality of second, reaction torque plates;

each said first and second torque plates having a generally flat, annular disk portion;

said disk portions on said first and second torque plates being interleaved:

said piston assembly having a head portion selectively to compress said interleaved torque plates against said reaction plate;

an annular groove in said head portion;

passage means penetrating said disk portions;

an annular friction disk interposed between the disk portion of each said first and second interleaved torque plates;

aperture means penetrating each said friction disk;

an annular channel means in an obverse engaging face of said friction disks;

said annular groove in said head portion being disposed to communicate with said annular channel means in a contiguously juxtaposed friction disk;

said passage means in said disk portions of said first and second torque plates being disposed in register with each other and with said aperture means penetrating said friction disks.

2. A torque transfer device, as set forth in claim 1, wherein:

said passage means in said disk portions of said first and second torque plates are selected from a group consisting of either circumferentially spaced annularly, disposed slots or circumferentially spaced bores.

3. A torque transfer device, as set forth in claim 2, wherein each said friction disk further comprises:

a planar, reverse surface;

means to secure said reverse surface on each said friction disk to said disk portion of either said first or second torque plate; and, an obverse engaging surface on each said friction disk operatively to engage said disk portion of the torque plate successively adjacent to the torque plate to which said friction disk is secured.

4. A torque transfer device, as set forth in claim 3, further comprising:

a radially inner and a radially outer edge on each said friction disk;

said channel being disposed in closer proximity to said radially inner edge than to said radially outer edge.

5. A torque transfer device, as set forth in claim 3, wherein:

said channel is approximately twice as far from said radially outer edge as it is from said radially inner edge.

6. A torque transfer device, as set forth in claim 5, wherein;

said friction disks have between fifteen and thirty circumferentially spaced, radially extending recesses.

7. A torque transfer device, as set forth in claim 1, further comprising:

a flow restricting means to control the volumetric rate at which a cooling medium may be admitted to said annular groove under a predetermined pressure.

8. A torque transfer device, as set forth in claim 7, wherein:

said flow restricting means limits the admission of a cooling medium at a volumetric flow rate of between 0.2 gallons per minute and 1.0 gallons per minute.

9. A torque transfer device, as set forth in claim 8, wherein:

said aperture means penetrating said friction disks are circumferentially spaced slots within said annular channel means.

10. A torque transfer device, as set forth in claim 9, wherein:

said passage means in said disk portions of said first and second torque plates are circumferentially spaced, annularly disposed, slots.

11. A torque transfer device, as set forth in claim 9, wherein:

said passage means in said first and second torque plates are circumferentially spaced bores.

12. A torque transfer device, as set forth in claim 9, wherein:

said passage means in said disk portions of said first and second torque plates are selected from a group consisting of either circumferentially spaced, annularly disposed slots or circumferentially spaced bores.

13. A torque transfer device comprising:

a reaction plate:

a piston assembly;

a plurality of first, apply torque plates;

a plurality of second, reaction torque plates;

each said first and second torque plates having a generally flat, annular disk portion:

said disk portions on said first and second torque plates being interleaved;

passage means penetrating said disk portions;

an annular friction disk interposed between the disk portion of each said first and second interleaved torque plates:

an obverse engaging surface on each said friction disk operatively to engage said disk portion of the torque plate successively adjacent to the torque plate to which said friction disk is secured;

an annular channel means in said obverse engaging face of said friction disks;

aperture means penetrating each said friction disk;

said passage means in said disk portion of said first and second torque plates being disposed in register with each other and with said aperture means penetrating said friction disks:

said annular channel means is approximately twice as far from said radially outer edge as it is from said radially inner edge;

said friction disks have between fifteen and thirty circumferentially spaced, radially extending recesses;

said piston assembly having a head portion selectively to compress said interleaved torque plates against said reaction plate;

an annular groove in said head portion;

said annular groove being disposed to communicate with said channel in a contiguously juxtaposed friction disk.

* * * * *